(12) United States Patent
Nitz et al.

(10) Patent No.: US 6,370,590 B1
(45) Date of Patent: *Apr. 9, 2002

(54) METHOD AND APPARATUS FOR PROVIDING INTER-APPLICATION PROGRAM COMMUNICATION USING A COMMON VIEW

(75) Inventors: David Nitz, San Francisco; Dave McBride, San Jose, both of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/052,049

(22) Filed: Mar. 30, 1998

(51) Int. Cl.[7] .................................................. G06F 9/54
(52) U.S. Cl. ...................................... 709/317; 709/310
(58) Field of Search ................................. 709/202, 303, 709/232, 224, 201, 315, 317, 310–400

(56) References Cited

U.S. PATENT DOCUMENTS

| | | | |
|---|---|---|---|
| 5,119,465 A | * 6/1992 | Jack et al. | 395/500 |
| 5,561,769 A | 10/1996 | Kumar et al. | |
| 5,701,423 A | * 12/1997 | Crozier | 345/335 |
| 5,734,905 A | * 3/1998 | Oppenheim | 709/303 |
| 5,862,325 A | * 1/1999 | Reed et al. | 709/201 |
| 5,991,806 A | * 11/1999 | McHann, Jr. | 709/224 |
| 6,085,203 A | * 7/2000 | Ahlers et al. | 707/523 |
| 6,192,419 B1 | * 2/2001 | Aditham et al. | 709/315 |

* cited by examiner

Primary Examiner—St. John Courtenay, III
Assistant Examiner—Van Hoa Nguyen
(74) Attorney, Agent, or Firm—Hickman Palermo Truong & Becker LLP; Edward A. Becker

(57) ABSTRACT

According to an approach for providing communication between sub-applications in a vertical application, messages transmitted by sub-applications in message formats supported by the sub-applications are translated to produce messages in a predetermined common message format referred to herein as a "common view." Messages to be received by sub-applications in the common view are translated to produce messages in the formats supported by the sub-applications.

An adapter attached to each sub-application provides for the translation of messages between a message format supported by the sub-application to which it is attached and the common view.

17 Claims, 6 Drawing Sheets

METHOD AND APPARATUS FOR PROVIDING INTER-APPLICATION PROGRAM COMMUNICATION USING A COMMON VIEW

FIELD OF THE INVENTION

The present invention relates to computer software, and more specifically, to a method and apparatus for providing communication between application programs.

BACKGROUND OF THE INVENTION

In the context of computer software, an application program, sometimes referred to as an "application," is a complete, self-contained computer program that performs one or more specific functions directly for a user. Application programs are sometimes integrated to create a "vertical application." Vertical applications are created when it is useful or convenient to have two or more application programs integrated together. The application programs in a vertical application are referred to as "sub-applications."

For example, a database application, a spreadsheet application and a word processing application may be integrated to create a vertical application. Then, database data can be retrieved by the database sub-application and passed directly to the spreadsheet sub-application for processing. The spreadsheet sub-application can then pass the spreadsheet data to the word processing sub-application to be used in a document. The spreadsheet data can also be sent by the spreadsheet sub-application back to the database sub-application so that the database can be updated.

Vertical applications are also created for specific situations, such as particular industries or par customers. For example, a vertical application may include generic database, spreadsheet and word processing sub-applications and a custom financial sub-application developed for a particular industry.

One of the most difficult aspects of creating a vertical application is providing a way for sub-applications to communicate with each other. Sub-applications must communicate with each other when processing performed by one sub-application affects processing performed by another sub-application. In the previous example, output data generated by the spreadsheet sub-application is used as input data by the database sub-application.

One approach for providing communication between sub-applications is to implement a messaging scheme that allows sub-applications to exchange data using messages. A message is a body of data that is formatted according to a particular format. Each sub-application generates messages according to a particular format and then transmits the message to the other sub-applications.

When all of the sub-applications in a vertical application are developed by a single source, a single messaging scheme can be implemented across all of the sub-applications so that each sub-application is aware of all the other sub-applications and knows how to communicate with them. However, when the sub-applications are not all developed by a single source, some sub-applications may not be able to communicate with other sub-applications using messages because they do not support the same messaging scheme. Another problem is that some sub-applications are not necessarily designed to communicate with other sub-applications at all. Sub-applications that are not designed to communicate with other applications through messages are not "message aware".

One approach for providing communication between sub-applications that do not all support compatible communication formats, or that are not all message aware, is to update the source code of the sub-applications to implement a single message scheme in all of the sub-applications. With a single messaging scheme, each sub-application knows which other sub-applications it has to communicate with and how to communicate with those other sub-applications. However, in many instances, the source code of one or more sub-applications cannot be accessed or changed, making this approach unavailable. Even if the required source code can be accessed and changed, doing so can be impractical because changing the source code can require a large amount of resources and time. In addition, the invasive nature of this approach can adversely affect the reliability of those sub-applications.

Another approach for providing communication between sub-applications that do not all support compatible communication formats or that are not all "message aware" involves the use of adapters. An adapter is essentially a translator that translates data in one format to produce data in another format. The data before and after the translation contains the same information. However, the format of the data is changed. For example, an adapter may translate a message in format A to produce a message in format B.

When used in a vertical application, an adapter is "attached" to a sub-application to enable that sub-application to send messages to a target sub-application in the message format supported by the target sub-application without making significant changes to the sub-applications. An adapter may be integrated into its corresponding sub-application or may be more loosely associated with its corresponding sub-application. When the sub-application transmits or "publishes" a message to a target sub-application, the adapter ensures that the published message is in the format expected by the target sub-application so that the target sub-application will be able to successfully decipher the message. When the sub-application receives or "subscribes" to a message from the target sub-application, an adapter ensures that the received message is in the format expected by the sub-application so that the sub-application will be able to successfully decipher the message.

For example, consider FIG. 1, which illustrates a vertical application 100 that includes four sub-applications identified as SUB-APP1, SUB-APP2, SUB-APP3 and SUB-APP4. Sub-application SUB-APP1 supports messages that are in format 1. This means that sub-application SUB-APP1 transmits messages in format 1 and can successfully decipher messages received in format 1. Sub-application SUB-APP2 supports messages that are in format 2. Thus, sub-applications SUB-APP1 and SUB-APP2 cannot successfully communicate with each other directly because they support incompatible message formats.

According to the adapter approach, an adapter A1 is attached to sub-application SUB-APP1 and translates messages transmitted by sub-application SUB-APP1 in format 1 to produce messages in format 2. When a message is sent by sub-application SUB-APP1 to sub-application SUB-APP2, in format 1, the message is translated by adapter A1 to produce a message in format 2 that is sent to sub-application SUB-APP2. Thus, adapter A1 allows sub-operation SUB-APP1 to send messages to sub-application SUB-APP2 that can be successfully deciphered by sub-application SUB-APP2.

To allow sub-application SUB-APP2 to send messages to sub-application SUB-APP1 that sub-application SUB-APP1 can understand, an adapter A2 is attached to sub-application SUB-APP2 which translates messages transmitted by sub-application SUB-APP2 in format 2 to produce messages in format 1. When a message is sent by sub-application SUB-APP2 to sub-application SUB-APP1 in format 1, the message is translated by adapter A2 to produce a message in format 1 which is then sent to sub-application SUB-APP1. Thus, adapters A1 and A2 allow sub-applications SUB-APP1 and SUB-APP2 to successfully communicate with each other even though they support different message formats.

Sub-application SUB-APP1 also needs to communicate with sub-application SUB-APP3. However, sub-application SUB-APP3 only supports messages in format 3. To allow sub-application SUB-APP1 to send messages to sub-application SUB-APP3 that sub-application SUB-APP3 can understand, an adapter A3 is attached to sub-application SUB-APP1 which translates messages in format 1 to produce messages in format 3. When a message is sent by sub-application SUB-APP1 to sub-application SUB-APP3 in format 1, the message is translated by adapter A3 to produce a message in format 3 which is then sent to sub-application SUB-APP3. An adapter A4 is attached to sub-application SUB-APP3 which translates messages in format 3 to produce messages in format 1. When a message is sent by sub-application SUB-APP3 to sub-application SUB-APP1 in format 3, the message is translated by adapter A4 to produce a message in format 1 which is then sent to sub-application SUB-APP1. Thus, adapters A3 and A4 allow sub-applications SUB-APP1 and SUB-APP3 to communicate with each other even though they support different message formats.

Although adapters allow sub-applications that support different message formats to successfully communicate with each other, using adapters can have some drawbacks, particularly when the number of sub-applications in a vertical application is large. Adapters behave like direct connections between sub-applications since a sub-application must know the identity of the sub-application to which it is sending and receiving messages so that the correct adapter can be used. In order for two sub-applications to exchange messages using adapters, two different adapters are required, one on each sub-application. For three sub-applications, six adapters are required. For four sub-applications, as illustrated in FIG. 1, twelve adapters are required. Consequently, the number of required adapters grows exponentially with the number of sub-applications, making the adapter approach non-scalable.

Besides the large number of adapters that are required for some vertical applications, maintaining the adapters can require significant resources. If a message format supported by a sub-application is changed, all of the adapters for sub-applications that support the changed message format must be changed. In addition, adapters attached to other sub-applications used to communicate with the sub-applications that support the changed message format must be updated. For example, in FIG. 1, if the message format for sub-application SUB-APP1 is updated, then adapters A1, A3 and A5 that are attached to sub-application SUB-APP1 must be updated so that messages in format 1 can be properly translated into messages in formats 2, 3 and 4, respectively. In addition, adapters A2, A4 and A6 must be updated so that messages in message formats 2, 3 and 4 can be properly translated into messages in format 1. Thus, even a small change to only a single message format can require changes to a large number of adapters.

In addition, if a new sub-application is added to the vertical application that supports another message format, then an entire new set of adapters must be created for the new sub-application to enable the new sub-application to communicate with other sub-applications. New adapters must also be added to each sub-application that the new sub-application is to communicate with. Thus, changes to existing message formats, or adding a new sub-application that supports a different message format can require a large amount of resources and time to maintain existing adapters and create new adapters. This makes the adapter approach undesirable, particularly for vertical applications that have a large number of sub-applications.

Based on the need to provide communication between sub-applications in vertical applications and the limitations in the prior approaches, an approach for providing communication between sub-applications that avoids the use of adapters that translate between a message format supported by one sub-application and a message format supported by another sub-application as previously described is highly desirable.

SUMMARY OF THE INVENTION

According to an aspect of the invention, a method provides for communication between a first application program that supports a first message format and a second application program that supports a second message format. The method includes the steps of translating messages that are transmitted by the first application program in the first message format to messages in a third message format, wherein the third message format is distinct from the first and second message formats; translating messages to be received by the first application program from the third message format to messages in the first message format; translating messages that are transmitted by the second application program in the second message format to messages in the third message format; and translating messages to be received by the second application program from the third message format to messages in the second message format.

According to another aspect of the invention, a method provides communication between a first application program that supports a first message format and a second application program that supports a second message format. According to the method, a first message is transmitted in the first message format from the first application program to a first agent associated with the first application program. Then, the first message is translated to produce a second message in a third message format, wherein the third message format is distinct from the first and second message formats. The second message is transmitted from the first agent to a broker. The second message is transmitted to a second agent associated with the second application program. The second message is translated to produce a third message in the second message format and the third message is transmitted to the second application program.

According to another aspect of the invention, a computer system provides communication between a first application program that supports a first message format and a second application program that supports a second message format. The computer system is comprised of one or more processors and a memory communicatively coupled to the one or more processors and containing the first and second application programs. Messages transmitted by the first application program in the first message format are translated to produce messages in a common message format. Messages to be received by the first application program in the common message format are translated to produce messages in the first message format. The common message format is distinct from the first and second message formats and wherein messages transmitted by the second application program in the second message format are translated to produce messages in the common message format and messages to be received by the second application program in the common message format are translated to produce messages in the second message format.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

FUNCTIONAL OVERVIEW

In general, the approach for providing communication between sub-applications in a vertical application, according to an embodiment of the invention, involves exchanging messages between sub-applications in a predetermined common message format referred to herein as a "common view." According to this approach, messages transmitted by sub-applications in message formats supported by the sub-applications are translated to produce messages in the common view. In addition, messages to be received by sub-applications in the common view are translated to produce messages in the formats supported by the sub-applications. Hence, sub-applications only need to know about the message formats they support and the common view. Sub-applications do not need to know about message formats supported by other sub-applications.

As described hereinafter, an embodiment of the invention uses a single adapter attached to each sub-application. The adapter provides for the translation of messages between a message format supported by the sub-application to which it is attached and the common view.

Another embodiment of the invention includes the use of a common view with an agent/broker architecture.

THE COMMON VIEW

Figure 1:
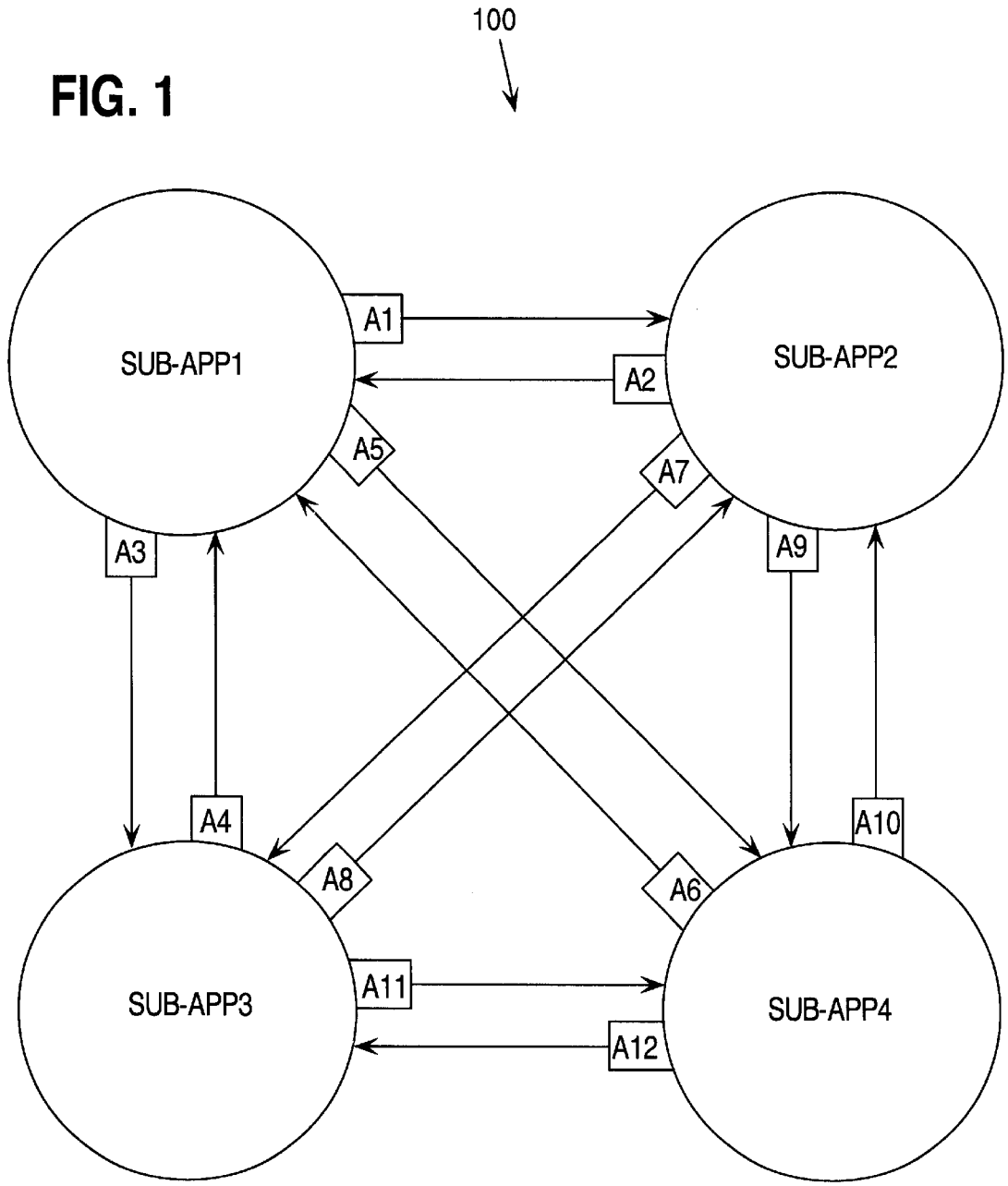
FIG. 1 is a block diagram of a conventional vertical application program that provides communication between sub-applications.
Figure 2:
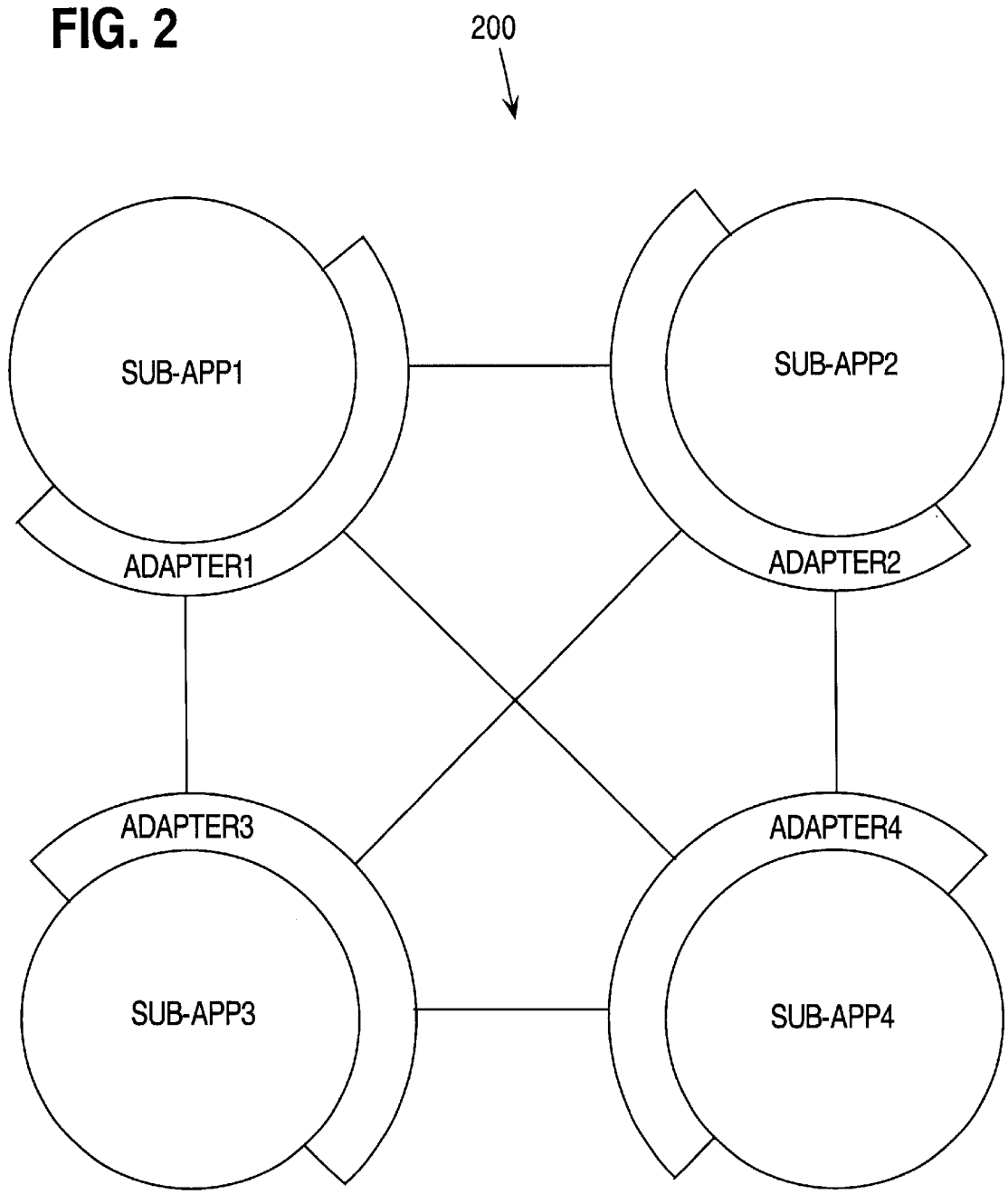
FIG. 2 is a block diagram of a vertical application program that provides communication between sub-applications according to an embodiment of the invention.

FIG. 2 illustrates a vertical application 200 that provides communication between sub-applications in a vertical application using adapters according to an embodiment of the invention. Vertical application 200 includes four sub-applications identified as SUB-APP1, SUB-APP2, SUB-APP3 and SUB-APP4 that each support their own message formats, namely, format 1, format 2, format 3 and format 4, respectively.

An adapter ADAPTER1 is attached to sub-application SUB-APP1 and performs several functions. Adapter ADAPTER1 receives messages transmitted by sub-application SUB-APP1 in format 1 before they are sent to other sub-applications. Adapter ADAPTER1 translates these messages in format 1 to produce messages in the common view which is a predetermined message format identified herein as "format X." Then, adapter ADAPTER1 transmits the messages in format X to a target sub-application. Adapter ADAPTER1 also translates messages received in format X from other sub-applications to produce messages in format 1. These messages in format 1 are then transmitted from adapter ADAPTER1 to sub-application SUB-APP1.

An adapter ADAPTER2 is attached to sub-application SUB-APP2 and performs several functions. Adapter ADAPTER2 receives messages transmitted by sub-application SUB-APP2 in format 2 before they are sent to other sub-applications. Adapter ADAPTER2 translates the messages in format 2 to produce messages in format X. Then, adapter ADAPTER2 transmits the messages in format X to a target sub-application. Adapter ADAPTER2 also translates messages received in format X from other sub-applications to produce messages in format 2. The messages in format 2 are then transmitted from adapter ADAPTER2 to sub-application SUB-APP2.

As illustrated in FIG. 2, an adapter ADAPTER3 is attached to sub-application SUB-APP3 for translating messages transmitted by sub-application SUB-APP3 in format 3 to produce messages in format X and for translating messages received in format X to produce messages in format 3. Also, an adapter ADAPTER4 is attached to sub-application SUB-APP4 for translating messages transmitted by sub-application SUB-APP4 in format 4 to messages in format X and for translating messages received in format X to messages in format 3.

Figure 3:
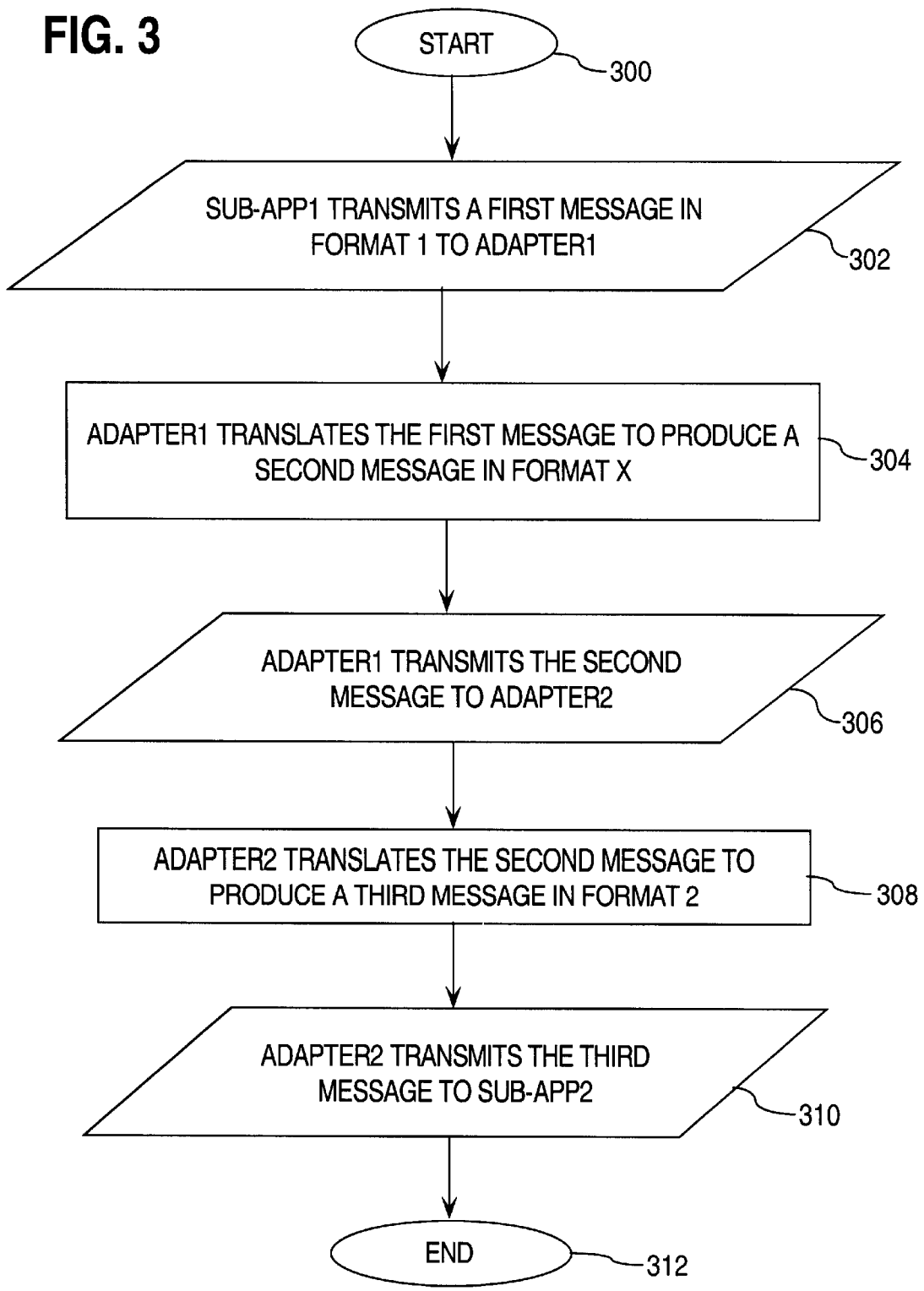
FIG. 3 is flow chart illustrating a method for transmitting a message between two sub-applications in a vertical application according to an embodiment of the invention.

An exchange of a message between sub-applications SUB-APP1 and SUB-APP2 is described with reference to the flow chart of FIG. 3. After starting in step 300, in step 302, sub-application SUB-APP1 transmits a first message in format 1 to adapter ADAPTER1. In step 304, adapter ADAPTER1 translates the first message in format 1 and produces a second message in format X. The second message contains the identical information as the first message, except that the second message is in format X instead of format 1.

In step 306, adapter ADAPTER1 transmits the second message to adapter ADAPTER2 attached to sub-application SUB-APP2. In step 308, adapter ADAPTER2 translates the second message in format X and produces a third message in format 2. The third message contains the same information as the first and second messages, except that the third message is in format 2.

In step 310 adapter ADAPTER2 transmits the third message (in format 2) to sub-application SUB-APP2. The process is complete in step 312. Thus, sub-applications SUB-APP1 and SUB-APP2 communicate with each other by translating messages in the format that they support to produce messages in format X and by translating messages in format X to produce messages in the format they support.

Sub-applications SUB-APP1, SUB-APP2, SUB-APP3 and SUB-APP4 do not need to know any details about the message format supported by each other. This provides the benefit that changes made to a particular message format only affect the adapters attached to the sub-applications that support the particular message format. For example, suppose a change is made to format 1 supported by sub-application SUB-APP1. This change requires adapter ADAPTER1 to be updated but does not affect sub-applications SUB-APP1, SUB-APP2, SUB-APP3 and SUB-APP4 or adapters ADAPTER2, ADAPTER3 or ADAPTER4.

Another benefit of this approach is that the number of required adapters grows linearly with the number of sub-applications and is therefore scalable. As illustrated in FIG. 2, the number of required adapters for two sub-applications is two, for three sub-applications three and for four sub-applications four. In situations where a sub-application supports more than one message format only one additional adapter needs to be provided for each additional message format supported by the sub-application.

AGENT/BROKER ARCHITECTURE

According to another embodiment of the invention, an agent/broker architecture is employed to provide communication between sub-applications in a vertical application. According to this approach, an agent is attached to each sub-application and like the previously described adapters, is configured to translate messages between the message format supported by the sub-application and the common view. However, instead of agents being directly coupled to other agents, each agent is linked to other agents attached to other sub-applications through a centralized broker that manages routing of messages between agents. When a sub-application begins executing, the agent attached to the sub-application registers with the broker by sending registration information to the broker. The registration information includes subscription criteria that is used by the broker to determine which message are to be routed to the agent. The broker maintains a record of the sub-applications/agents that have registered and are active.

As the sub-applications begin executing, the sub-applications transmit messages to their corresponding agents in the format supported by the sub-applications. The agents then translate the messages in the format supported by the sub-applications to produce messages in the common view (format X). Then the messages (in format X) are transmitted or "published" to the broker. The broker then evaluates the subscription criteria provided by the agents to determine which agents subscribes are to receive the messages. The broker then routes a messages to the subscribing agents.

After the agent receives the message, the agent translates the message in format X to produce a message in the format supported by the corresponding sub-application and transmits the translated message to the corresponding sub-application.

The agent/broker approach is not limited to a particular publication/subscription scheme. For example, instead of agents providing subscription criteria to the broker, messages may be "tagged" with the identity of the target sub-applications that are supposed to receive the messages. The broker may examine the tags and automatically route the messages to the designated sub-applications. Alternatively, the broker may include intelligence so that content-based routing may be implemented whereby the broker examines and perhaps even processes some of the message content to determine the target sub-applications.

Figure 4:
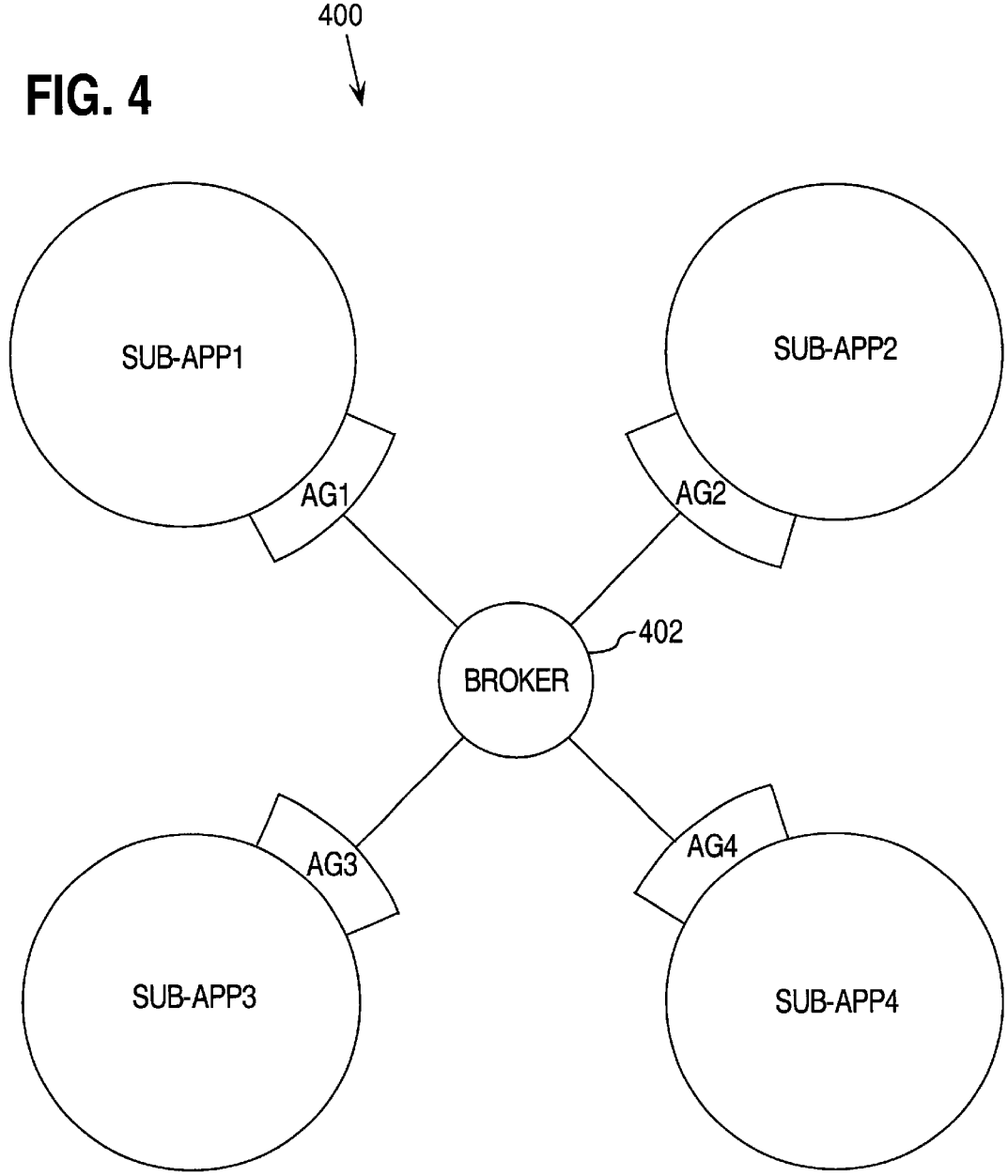
FIG. 4 is a block diagram of a vertical application program that uses an agent/broker architecture to provide communication between sub-applications in a vertical application according to an embodiment of the invention.

FIG. 4 illustrates a vertical application 400 that implements an agent/broker architecture for providing communication between sub-applications in a vertical application according to an embodiment of the invention. Vertical application 400 includes four sub-applications identified as SUB-APP1, SUB-APP2, SUB-APP3 and SUB-APP4 that each support distinct message formats, namely, format 1, format 2, format 3 and format 4, respectively.

An agent AG1 is attached to sub-application SUB-APP1 and performs several important functions. Agent AG1 receives messages transmitted by sub-application SUB-APP1 in format 1 and translates the messages to produce messages in format X. Agent AG1 then transmits the messages in format X to a broker 402 that manages the routing of messages between agents. Agent AG1 also receives messages in format X from broker 402, translates those messages to produce messages in format 1 and then transmits the messages in format 1 to sub-application SUB-APP1.

Agents AG2, AG3 and AG4 are attached to sub-applications SUB-APP2, SUB-APP3 and SUB-APP4 respectively and perform similar functions, except the translations are performed between the message formats supported by sub-applications SUB-APP2, SUB-APP3 and SUB-APP4 (i.e. format 1, format 2, format 3 and format 4) and format X.

As with the adapter approach, sub-applications SUB-APP1, SUB-APP2, SUB-APP3 and SUB-APP4 do not need to know any details about the message formats supported by each other. Changes made to a particular message format only affect the agents of sub-applications that support the particular message format. The changes are transparent to the other sub-applications (and their agents) that do not support the particular message format.

As with the prior approach, the agent/broker architecture is scalable because the number of required agents grows linearly with the number of sub-applications. Thus, the number of required agents for two sub-applications is two, for three sub-applications three and for four sub-applications four.

Figure 5:
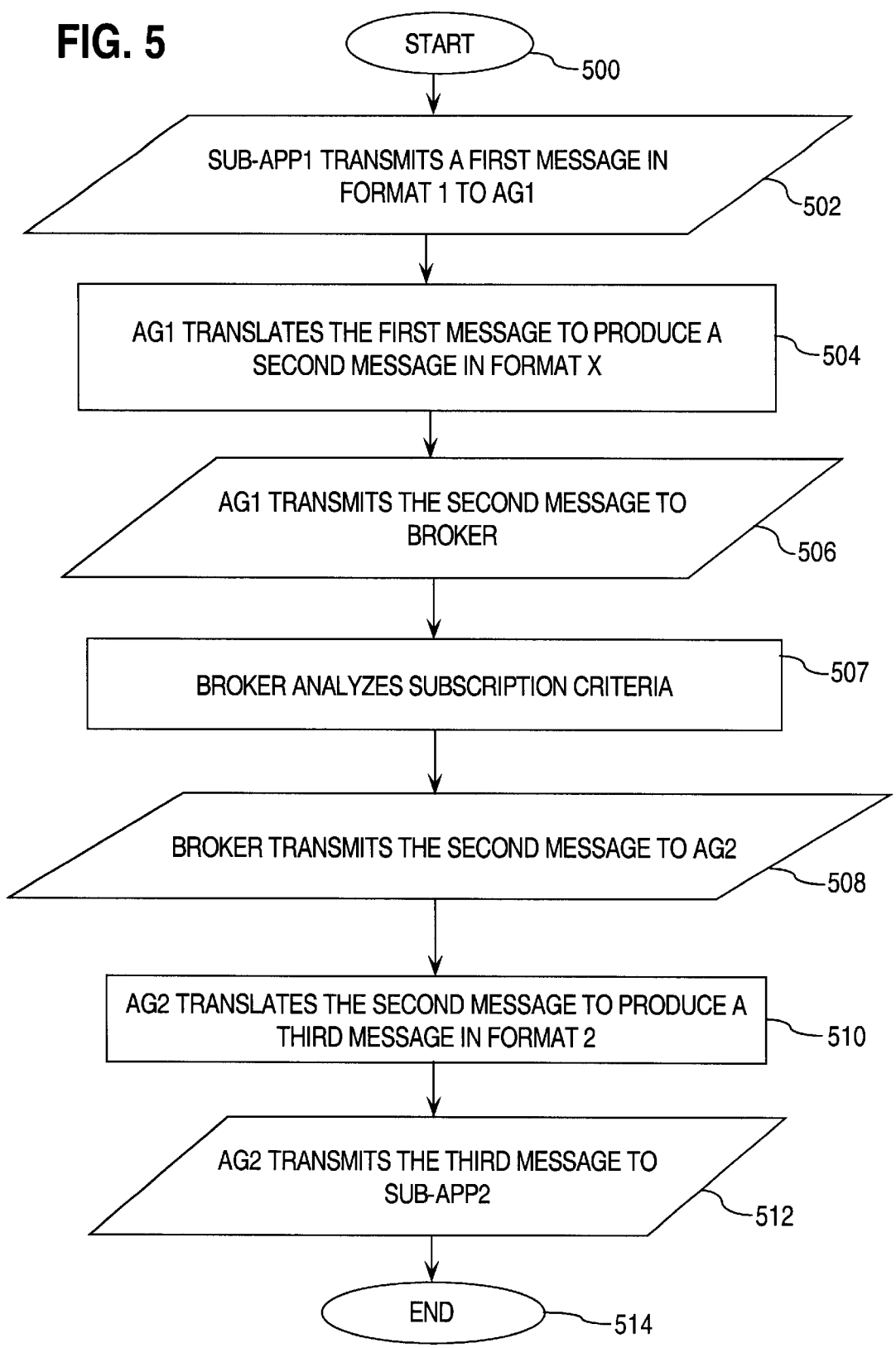
FIG. 5 is a flow chart illustrating a method for transmitting a message between two sub-applications in a vertical application using an agent/broker architecture according to an embodiment of the invention.

An exchange of a message between sub-applications SUB-APP1 and SUB-APP2 using the agent/broker architecture is described with reference to the flow chart of FIG. 5. After starting in step 500, in step 502, sub-application SUB-APP1 transmits a first message in format 1 to agent AG1. In step 504, agent AG1 translates the first message to produce a second message in format X. The second message contains the identical information as the first message, except that the second message is in format X.

In step 506, agent AG1 transmits the second message to broker 402. In step 507, broker 402 analyzes the subscription criteria provided by agents AG1, AG2, AG3 and AG4 and determine that agent AG2 in a subscriber of the second message. In step 508, broker 402 transmits the second message to agent AG2. In step 510, agent AG2 translates the second message to produce a third message in format 2. The third message contains the identical information as the first and second messages, except that the third message is in format 2.

In step 512, agent AG2 transmits the third message to sub-application SUB-APP2. The process is complete in step 514. Messages are transmitted from sub-application SUB-APP2 to sub-application SUB-APP1 in a similar manner, except in reverse.

The adapter, agents and broker described herein may be implemented as stand-alone software processes (local or remote) or may be integrated into their respective sub-applications. The adapters, agents and broker may also be implemented in discrete hardware components or a combination of discrete hardware components and software processes as described in more detail below.

Although embodiments of the invention are described herein in the context of providing communication between sub-applications in a single vertical application, the approaches described herein are also applicable to providing communication between application programs in multiple vertical applications. For example, embodiments of the invention may be used to provide communication between sub-applications in different vertical applications. In addition, the approach described herein for providing communication between sub-applications in a vertical application may also be employed to provide communication between application programs in general, including between application programs that are not part of a vertical application.

HARDWARE OVERVIEW

Figure 6:
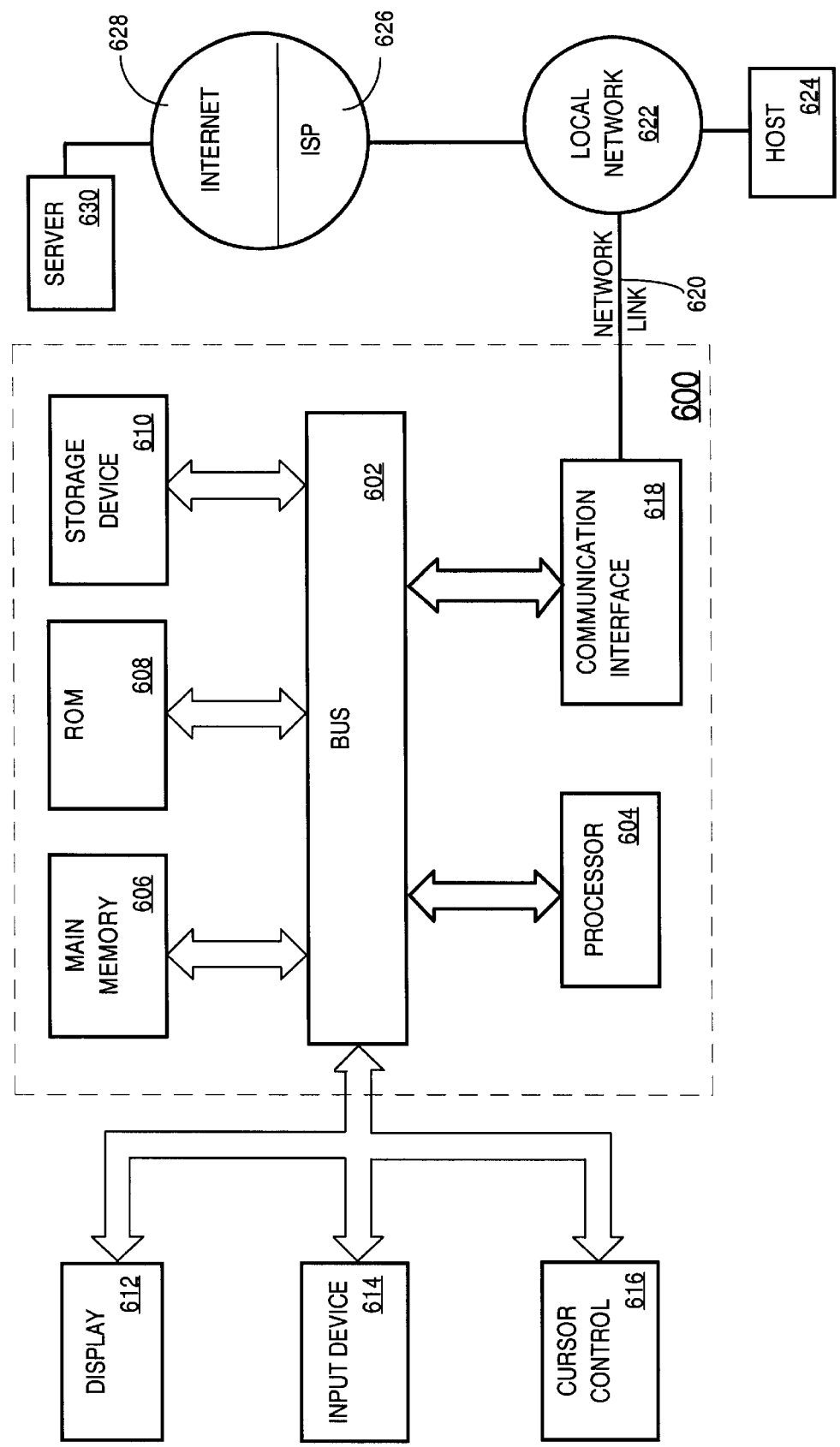
FIG. 6 is a block diagram of a computer system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for providing communication between sub-applications in a vertical application. According to one embodiment of the invention, providing communication between sub-applications in a vertical application is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for communication between sub-applications in a vertical application as described herein.

The received code may be executed by processor 604 as it is received, and/or stored in storage device 610, or other non-volatile storage for later execution. In this manner, computer system 600 may obtain application code in the form of a carrier wave.

The techniques described herein provide several advantages over prior approaches for providing communication between sub-applications in a vertical application. First, the approach is less intrusive than prior approaches because sub-application code does not have to be modified which preserves the integrity of the sub-applications. Also, only one adapter is required for each sub-application, providing a scalable solution. In addition, each adapter only needs to know how to translate messages between the message formats supported by its corresponding sub-application and the predetermined common message format (format X). Since all messages are translated into the predetermined format (format X), sub-applications do not need to know which other sub-applications will receive the messages they transmit.

Another advantage is the relative transparency to changes in message formats to sub-applications that don't support the changed message format. When a change is made to a particular message format, only the adapter or agent attached to the sub-application that supports the particular message format must be changed. The changes are transparent to adapters and agents of other sub-applications that do not support the message format that was changed.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for providing communication between a first application program that supports a first message format and a second application program that supports a second message format, the method comprising the steps of:

translating messages that are transmitted by the first application program in the first message format to messages in a third message format, wherein the third message format is distinct from the first and second message formats;

translating messages to be received by the first application program from the third message format to messages in the first message format;

translating messages that are transmitted by the second application program in the second message format to messages in the third message format; and translating messages to be received by the second application program from the third message format to messages in the second message format.

2. The method of claim 1, wherein the method further includes the steps of transmitting the messages that are transmitted by the first application program in the first message format to a first adapter associated with the first application program, transmitting the messages to be received by the first application program to the first adapter, transmitting the messages that are transmitted by the second application program in the second message format to a second adapter associated with the second application program, and transmitting the messages to be received by the second application program to the second adapter.

3. The method of claim 2, wherein the step of translating messages that are transmitted by the first application program in the first message format to messages in a third message format comprises the step of the first adapter translating messages that are transmitted by the first application program in the first message format to messages in a third message format, the step of translating messages received by the first application program in the third message format to produce messages in the first message format comprises the step of the first adapter translating messages to be received by the first application program that are in the third message format to produce messages in the first message format, the step of translating messages transmitted by the second application program in the second message format to messages in the third message format comprises the step of the second adapter translating messages transmitted by the second application program in the second message format to produce messages in the third message format, and the step of translating messages to be received by the second application program that are in the third message format to produce messages in the second message format comprises the step of the second adapter translating messages received by the second application program in the third message format to produce messages in the second message format.

4. The method of claim 2, wherein:

the method further includes the steps of transmitting to a broker the messages in the third format that were produced from a translation of the messages in the first format, transmitting to the broker the messages in the third format that were produced from a translation of the messages in the second format, and messages transmitted to the first adapter in the third message format are transmitted from the broker to the first adapter, and messages transmitted to the second adapter in the third message format are transmitted from the broker to the second adapter.

5. A method for providing communication between a first application program that supports a first message format and a second application program that supports a second message format, the method comprising the steps of:

transmitting a first message in the first message format from the first application program to a first agent associated with the first application program;

translating the first message to produce a second message in a third message format, wherein the third message format is distinct from the first and second message formats;

transmitting the second message from the first agent to a broker;

transmitting the second message to a second agent associated with the second application program;

translating the second message to produce a third message in the second message format; and transmitting the third message to the second application program.

6. The method of claim 5, further including the steps of
transmitting a fourth message in the second message format from the second application program to the second agent, translating the fourth message to a produce fifth message in the third message format, transmitting the fifth message from the second agent to the broker, transmitting the fifth message from the broker to the first agent, translating the fifth message to produce a sixth message in the first message format, and transmitting the sixth message from the first agent to the first application program.

7. The method of claim 5, further including the step of registering the first agent with the broker by providing subscription criteria to the broker that specifies messages to be received by the first application program.

8. A computer system for providing communication between a first application program that supports a first message format and a second application program that supports a second message format, the computer system comprising:

one or more processors; and a memory communicatively coupled to the one or more processors and containing the first and second application programs;

wherein messages transmitted by the first application program in the first message format are translated to produce messages in a common message format and messages to be received by the first application program in the common message format are translated to produce messages in the first message format, wherein the common message format is distinct from the first and second message formats, and wherein messages transmitted by the second application program in the second message format are translated to produce messages in the common message format and messages to be received by the second application program in the common message format are translated to produce messages in the second message format.

9. The computer system of claim 8, further comprising a first adapter associated with the first application program for translating the messages transmitted by the first application program in the first message format to produce the messages in the common message format and for translating the messages to be received by the first application program in the common message format to produce the messages in the first message format, and a second adapter associated with the second application program for translating the messages transmitted by the second application program in the second message format to produce the messages in the common message format and for translating the messages to be received by the second application program in the common message format to produce the messages in the second message format.

10. The computer system of claim 9, further comprising a broker, communicatively coupled to the first adapter and the second adapter for exchanging messages between the first adapter and the second adapter.

11. A computer-readable medium carrying one or more sequences of one or more instructions for providing communication between a first application program that supports a first message format and a second application program that supports a second message format, the one or more sequences of one or more instructions including instructions which, when executed by one or more processors, cause the one or more processors to perform the steps of:

translating messages that are transmitted by the first application program in the first message format to messages in a third message format, wherein the third message format is distinct from the first and second message formats;

translating messages to be received by the first application program from the third message format to messages in the first message format;

translating messages that are transmitted by the second application program in the second message format to messages in the third message format; and translating messages to be received by the second application program from the third message format to messages in the second message format.

12. The computer-readable medium of claim 11, wherein the one or more sequences of one or more instructions further include instructions for performing the steps of transmitting the messages that are transmitted by the first application program in the first message format to a first adapter associated with the first application program, transmitting the messages to be received by the first application program to the first adapter, transmitting the messages that are transmitted by the second application program in the second message format to a second adapter associated with the second application program, and transmitting the messages to be received by the second application program to the second adapter.

13. The computer-readable medium of claim 12, wherein the step of translating messages that are transmitted by the first application program in the first message format to messages in a third message format comprises the step of the first adapter translating messages that are transmitted by the first application program in the first message format to messages in a third message format, the step of translating messages received by the first application program in the third message format to produce messages in the first message format comprises the step of the first adapter translating messages to be received by the first application program that are in the third message format to produce messages in the first message format, the step of translating messages transmitted by the second application program in the second message format to messages in the third message format comprises the step of the second adapter translating messages transmitted by the second application program in the second message format to produce messages in the third message format, and the step of translating messages to be received by the second application program that are in the third message format to produce messages in the second message format comprises the step of the second adapter translating messages received by the second application program in the third message format to produce messages in the second message format.

14. The computer-readable medium of claim 12, wherein the one or more sequences of one or more instructions further include instructions for performing the steps of transmitting to a broker the messages in the third format that were produced from a translation of the messages in the first format, transmitting to the broker the messages in the third format that were produced from a translation of the messages in the second format, and wherein messages transmitted to the first adapter in the third message format are transmitted from the broker to the first adapter, and wherein messages transmitted to the second adapter in the third message format are transmitted from the broker to the second adapter.

15. A computer-readable medium carrying one or more sequences of one or more instructions for providing communication between a first application program that supports a first message format and a second application program that supports a second message format, the one or more sequences of one or more instructions including instructions which, when executed by one or more processors, cause the one or more processors to perform the steps of:

transmitting a first message in the first message format from the first application program to a first agent associated with the first application program;

translating the first message to produce a second message in a third message format, wherein the third message format is distinct from the first and second message formats;

transmitting the second message from the first agent to a broker;

transmitting the second message to a second agent associated with the second application program;

translating the second message to produce a third message in the second message format; and transmitting the third message to the second application program.

16. The computer-readable medium of claim 15, wherein the one or more sequences of one or more instructions further include instructions for performing the steps of transmitting a fourth message in the second message format from the second application program to the second agent, translating the fourth message to a produce fifth message in the third message format, transmitting the fifth message from the second agent to the broker, transmitting the fifth message from the broker to the first agent, translating the fifth message to produce a sixth message in the first message format, and transmitting the sixth message from the first agent to the first application program.

17. The computer-readable medium of claim 15, further including the step of registering the first agent with the broker by providing subscription criteria to the broker that specifies messages to be received by the first application program.

\* \* \* \* \*